May 16, 1967  C. J. AMATO ETAL  3,320,515
SIGNAL-PRODUCING CIRCUIT
Filed Aug. 19, 1964  2 Sheets-Sheet 1

INVENTORS
CARMELO J. AMATO
DENNIS I. LAWRENCE
BY Bosworth, Sessions,
Herrstrom & Knowles
ATTORNEYS United States Patent Office 3,320,515
Patented May 16, 1967

3,320,515
SIGNAL-PRODUCING CIRCUIT
Carmelo J. Amato, Shaker Heights, and Dennis I. Lawrence, Solon, Ohio, assignors to Lear Siegler, Inc., Los Angeles, Calif., a corporation of Delaware
Filed Aug. 19, 1964, Ser. No. 390,649
13 Claims. (Cl. 321—45)

This invention relates to cycloconverters and their operation and particularly to improved circuit means for selectively switching positive and negative current-conducting groups within a cycloconverter in accordance with the cycloconverter alternating output current or an alternating current corresponding thereto.

A cycloconverter characteristically comprises two major elements, a positive current group and a negative current group, connected in parallel between a supply and the cycloconverter output which is connected to a load. As is well known, each group may consist of a number of rectifying and switching devices, such as mercury arc rectifiers, silicon controlled rectifiers, or thyratrons, connected in some well-known rectifier configuration. The output current from each group can flow in only one direction. Therefore, in order to supply an alternating output current, the positive and negative groups must be connected back-to-back with respect to the output circuit so that each group may alternately provide a half cycle of each full cycle of output current.

It is well known in the cycloconverter art that instantaneous voltage differences may exist between the positive and negative groups of switching and rectifying devices. These voltage differences produce deleterious currents which circulate between the positive and negative groups within the cycloconverter if steps are not taken to suppress and/or reduce them or to positively interrupt their paths. Intergroup circulating currents have been reduced or limited in the past by chokes employed in the current paths between groups, but such means do not eliminate the undesirable currents.

Theoretically, intergroup circulating currents can be eliminated by insuring that only one current-conducting group is permitted to conduct at a time. This can be accomplished by blocking, diverting or otherwise suppressing the switching pulses supplied to the rectifying and switching devices of one group while permitting the switching pulses supplied to the other group of rectifying and switching devices to activate or fire them in the usual sequence known in the cycloconverter art.

In order to provide an alternating current output, the positive and negative groups of switching and rectifying devices must conduct alternately and, therefore, the means for preventing intergroup circulating currents in a cycloconverter by blocking, diverting or otherwise blanking the firing pulses provided for the two groups must act alternately with respect to the two groups. This function will be referred to in the description that follows as alternating group blanking or group switching.

This invention deals with alternating group blanking as described above which is activated or controlled by current information received from the two current-carrying groups. For example, circuit means for providing alternating group blanking or switching acts generally to blank firing pulses supplied to the positive group while the negative group is carrying current and to blank firing pulses supplied to the negative group while the positive group is carrying current. In theory, such as arrangement provided alternations in the group switching whenever the output current of the cycloconverter reaches zero current.

Alternating group switching timed in accordance with zero current in the alternating output current has certain limitations in practice, however, which produce undesirable results in the cycloconverter operation. One of these problems is inherent in a type of switching and rectifying device commonly employed in cycloconverter current-conducting groups. Such devices are of the type which are turned on by a control element which then loses control and is then unable to turn them off, such as thyratron or silicon controlled rectifiers. It is thus possible, when alternation in the group blanking occurs, that the blanked or non-conducting group may be turned on before all of the switching and rectifying devices of the other group have regained blocking control through changes in their anode-cathode voltages even though the firing pulses to the control elements of the switching and rectifying devices have been suppressed, diverted or otherwise blanked.

This problem and a circuit providing a solution are disclosed in co-pending application Ser. No. 312,110, filed Sept. 27, 1963, and assigned to the same assignee as this application. Briefly, this circuit comprises an alternating switching circuit for providing alternate blanking and unblanking signals and introducing a time delay between the signal blanking a conducting group and the signal unblanking a non-conducting group.

This invention deals with another practical problem encountered in the operation of cycloconverters employing alternating group switching timed in accordance with zero current in the alternating output current. The objects of this invention, as well as the description of a preferred and modified embodiment of it and an explanation of its utility in conjunction with cycloconverters, are set forth below, reference being made to the accompanying drawings in which.

Figure 1:
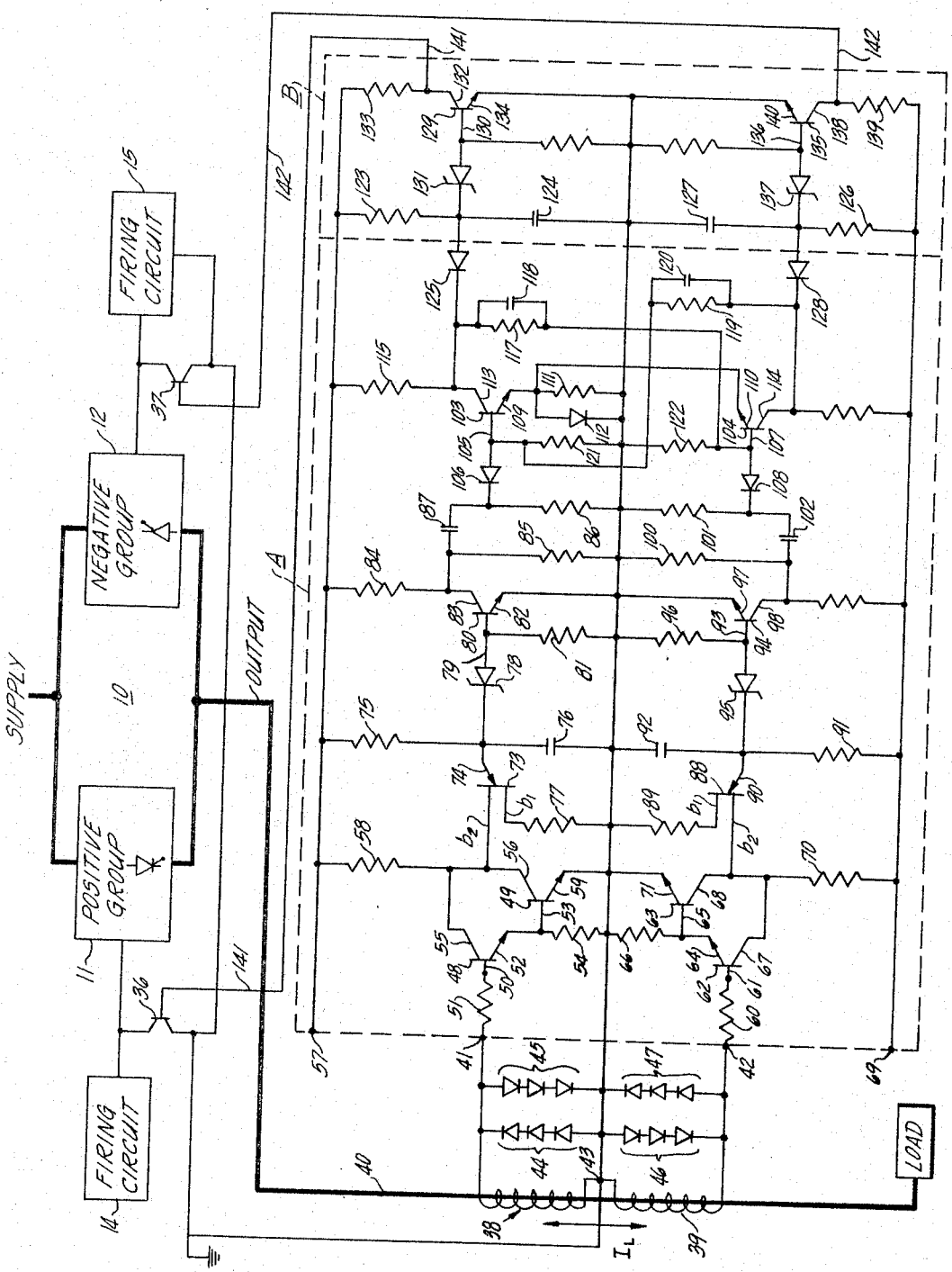
FIGURE 1 is a circuit diagram showing a preferred form of the alternating group circuit switching means embodying this invention and illustrating its relationship to a conventional cycloconverter as generally described above.

The upper part of FIGURE 1 diagrammatically shows a cycloconverter generally indicated by the reference numeral 10 comprising a positive current-conducting group 11, a negative current-conducting group 12 and associated firing circuits 14 and 15, respectively. The positive and negative groups 11 and 12, respectively, are connected in parallel between a supply or input and the cycloconverter output which, in turn, is connected to a load. As indicated by the controlled rectifier symbols within the blocks 11 and 12 representing the positive and negative current-conducting groups, the two groups are connected back-to-back with respect to the output circuit so that each group of switching and rectifying devices may alternatingly provide a half cycle of each full cycle of output current $I_L$.

Figure 2:
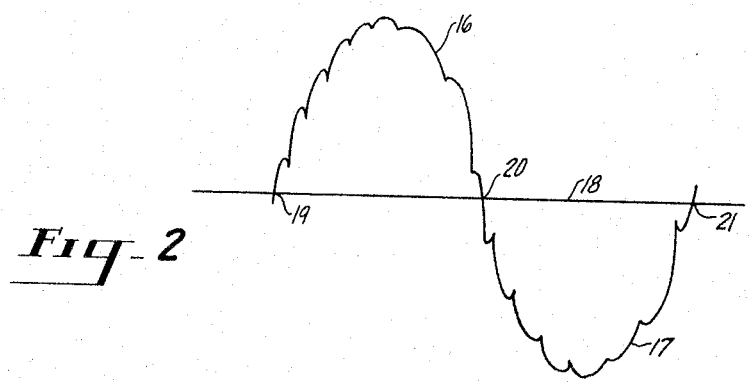
FIGURE 2 is a diagram of successive half waves of output current provided the positive group and the negative group of a cycloconverter operating into an inductive load.

As shown in FIGURE 2, the positive and negative groups of a cycloconverter operating into an inductive load produce an output current having wave forms typified by positive half wave 16 and negative half wave 17. Current waves 16 and 17 cross the line 18 indicating zero current at well defined points 19, 20 and 21.

Figure 3:
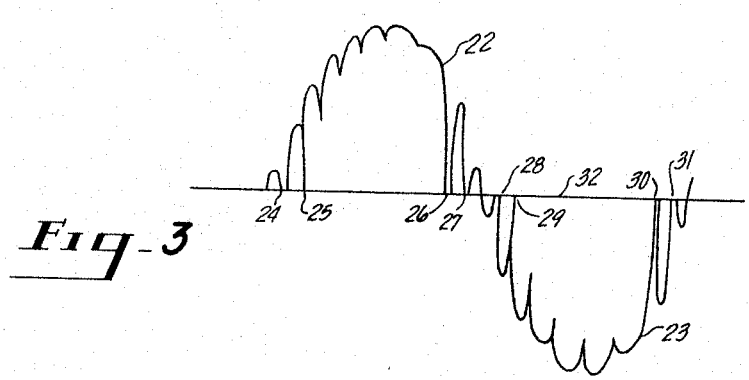
FIGURE 3 is a diagram similar to that of FIGURE 2, but typical of a cycloconverter operating into a resistive load.

As shown in FIGURE 3, the positive and negative groups of a cycloconverter operating into a resistive load produce output currents having wave forms typified by positive half wave 22 and negative half wave 23. When operating into a resistive load, the cycloconverter output current characteristically exhibits multiple crossings 24–31 of the line 32 indicating zero current.

Alternating group switching timed in accordance with zero current in the alternating output current made up of positive and negative half waves generally of the form shown in FIGURE 2 result in a relatively undistorted output current wave form. However, alternating group switching timed in accordance with zero current in the alternating output current produced by the half waves such as those shown in FIGURE 3 results in undesired and untimely switching between the current-conducting groups, causing severe wave form distortion in the output current of the cycloconverter. For example, in FIGURE 3, the point 24 of zero current in the positive half cycle current wave 22 causes alternate group switching means arranged to act or change to the opposite state upon the occurrence of zero output current to turn off the positive current-carrying group and to turn on the negative current-carrying group prematurely in the output current cycle. As is well known in cycloconverter operation, the applied voltage is positive during this portion of the output cycle so that such a condition corresponds to inverted operation of the negative current-conducting group. According to well understood rectifier theory, inversion cannot occur with a passive resistive load. Therefore, no current flows for the remainder of the positive current half cycle or wave 22. In like manner, the negative current-carrying group will be turned off prematurely at current zero crossing 28, producing substantially zero output current thereafter.

Figure 4:
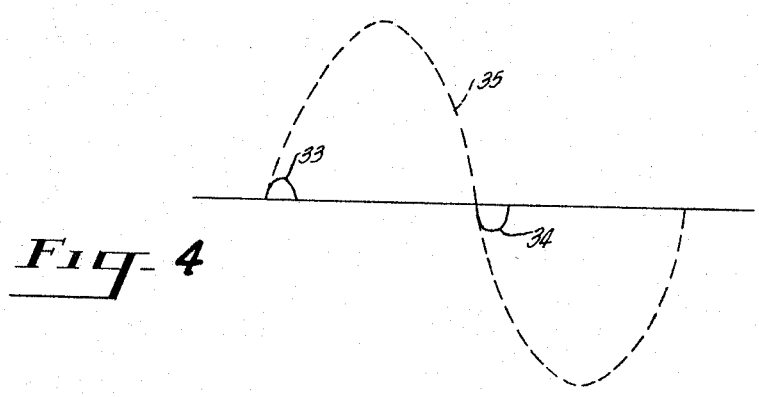
FIGURE 4 is a diagram showing a cycle of cycloconverter output current under certain conditions of operation.

This condition of operation is shown in FIGURE 4. The positive group operates only a short period of time as a rectifier producing useful output current indicated by solid line curve 33. In like fashion, the negative group operates mostly inverted and produces only a small effective output current indicated by solid line curve 34 during its short period of rectifier operation. In FIGURE 4, the theoretical full cycle output current wave form that positive and negative current-carrying groups should produce together is indicated by broken line curve 35.

Certain other conditions of cycloconverter operation alone and together with operation into a heavily resistive load can produce the same multiple crossings of the zero level by the output current. For example, when the ratio of the cycloconverter supply frequency to output frequency is high, multiple or false zero crossings of the output current also occur. Even when the cycloconverter is operating at near a 1:1 frequency ratio, however, similar false zero crossings by the output current result when the reference voltage is drastically lowered relative to the supply voltage in order to provide a low cycloconverter output voltage. The invention disclosed herein deals with the multiple or false zero crossing problem resulting from any or all of the operating conditions discussed above.

It is an object of this invention, therefore, to provide means to overcome problems of cycloconverter operation under conditions resulting in multiple or false zero crossings of the cycloconverter output current. In particular, an object is to provide improved circuitry for providing relatively undistorted output current wave forms from a cycloconverter employing alternate groups switching and operating into a resistive load. Yet another object is to provide such circuitry that is responsive only to crossings by the cycloconverter output current of the zero current level that are separated by a predetermined time interval. A further object of this invention is to provide such circuitry which functions to transmit only signals proportional to the cycloconverter output current means for accomplishing the alternate switching on and off of the current-conducting groups which contain signals of predetermined duration calling for a change in state of the switching means. Still another object is to provide such circuitry adapted to cooperate and coact with other circuitry for affecting the alternate switching between current-carrying groups of a cycloconverter and, particularly, to cooperate and coact with circuitry adapted to deliver the unblanking of a current-carrying group a predetermined interval of time after the corresponding blanking of the other current-carrying group.

The various features and advantages of this invention will be more apparent from the detailed description below and the accompanying drawings described above showing a preferred form of an alternating group switching circuit embodying this invention and illustrating its relationship to a conventional cycloconverter such as described above.

As described above, the upper part of FIGURE 1 shows a cycloconverter generally indicated by the reference numeral 10 comprising a positive current-conducting group 11 and a negative current-conducting group 12 connected in parallel with each other and associated firing circuits 14 and 15, respectively. Associated with the positive group 11 and its firing circuit 14 is a transistor 36 arranged to divert firing signals supplied by firing circuit 14 from positive group 11 through its collector-emitter circuit to ground. Thus, when a suitable signal is supplied to the base of transistor 36, positive group 11 is rendered non-conducting because the firing signals for activating its switching and rectifying devices are blanked or diverted from it. In the absence of such an appropriate signal to the base of transistor 36, positive group 11 is rendered conducting because the firing signals provided by firing circuit 14 are permitted to reach the switching and rectifying devices making up positive group 11.

A transistor 37 is similarly arranged with respect to negative group 12 and its firing circuit 15 for controlling the conduction of negative group 12 in accordance with signals supplied to the transistor base.

In the lower part of FIGURE 1 is shown a cycloconverter alternating output current sensor indicated generally by the reference numeral 38. Current sensor 38 comprises a center-tapped current transformer having a secondary winding 39 inductively associated with cycloconverter output conductor 40 and provided with output terminals 41 and 42 at its opposite ends and a center tap terminal 43. The output voltage of secondary winding 39 is preferably limited to an appropriate maximum value by four sets of serially connected diodes 44, 45, 46 and 47. Diode sets 44 and 45 are connected in opposite directions across that portion of secondary winding 39 between output terminal 41 and center tap 43. Diode sets 46 and 47 are connected in opposite directions across that portion of secondary winding 39 between output terminal 42 and center tap 43. The output voltage appearing between either of the output terminals 41 or 42 and the center tap 43 is thus limited to the value of the forward voltage drop across diode sets 45 and 47 or diode sets 44 and 46. Any number of serially connected diodes may be employed in each set, of course, in order to determine the desired maximum output voltages appearing between the output terminals and the center tap of secondary winding 39.

Secondary winding 39 of current sensor 38 is so arranged that pulses of a given polarity with respect to center tap 43 alternately appear at output terminals 41 and 42 of current sensor 38 in response to alternating output current $I_L$. A positive pulse appears at output terminal 41, for example, when negative group 12 is conducting and providing one half cycle of alternating output current $I_L$. A positive pulse appears at output terminal 42 when positive group 11 is conducting and providing the other half cycle of alternating output current $I_L$. As a result of diode sets 44–47, the voltage pulses appearing at the output terminals 41 and 42 are generally clipped sinusoidal pulses resembling square wave, low amplitude pulses.

Current sensor 38, as particularly described above and as shown in FIGURE 1, comprises a preferred means for supplying alternating trigger pulses to the alternating group switching circuit means of this invention. It is not to be implied, however, that other suitable sensing means cannot be used. Other current sensor arrangements, including composite sensing of the polyphase input currents to the cycloconverter, for example, may be utilized so long as they alternately provide output pulses at two output terminals in accordance with the sensed alternating output current or an alternating current corresponding thereto and of the appropriate polarity with respect to each other and ground to trigger the alternating group switching circuit means as described below.

Also shown in the lower part of FIGURE 1 is a broken line box A outlining alternating group switching means comprehended by this invention. Next to broken line box A is broken line box B outlining circuit means for providing a predetermined time delay between the unblanking of one of the current-conducting groups of a cycloconverter and the corresponding blanking of the other current-conducting group of a cycloconverter. The delay circuitry contained in box B is disclosed in the copending application mentioned above.

Output terminals 41 and 42 of current sensor 38 are each connected to an amplifier. Terminal 41 is connected to an amplifier comprising transistors 48 and 49 arranged in the well-known Darlington connection. Base 50 of transistor 48 is connected to terminal 41 through resistor 51. Emitter 52 of transistor 48 is connected to base 53 of transistor 49 and to ground and center tap 43 of secondary winding 39 through resistor 54. Collectors 55 and 56 of transistors 48 and 49, respectively, are connected together and to a source 57 of positive direct current potential through resistor 58. Emitter 59 of transistor 49 is connected to ground.

The other output terminal 42 is connected through resistor 60 to base 61 of transistor 62. Transistor 62 is coupled with transistor 63 in a Darlington connection with the emitter 64 of transistor 62 connected to the base 65 of transistor 63 and to ground through resistor 66. Collectors 67 and 68 of transistors 62 and 63, respectively, are connected together and to a source 69 of direct current potential through resistor 70. Emitter 71 of transistor 63 is connected to ground.

The output signal of the amplifier associated with output terminal 41 appearing at common collector connection of transistors 48 and 49 is connected to base 2 of unijunction transistor 73. Emitter 74 is connected to the junction between an RC combination of resistor 75 and capacitor 76 which, in turn, are connected to a positive source 57 of direct current potential and to ground, respectively. Base 1 of unijunction transistor 73 is connected through resistor 77 to ground. Emitter 74 of unijunction transistor 73 and the junction of the RC combination 75–76 are connected through Zener diode 78 to base 79 of switching transistor 80. Base 79 is connected to ground through resistor 81 and emitter 82 is connected directly to ground. Collector 83 is connected through resistor 84 to a source 57 of positive direct current potential.

The output pulses appearing at collector 83 of switching transistor 80 are applied to a differentiating circuit comprised of resistors 85 and 86 and capacitor 87 connected together in a well-known manner as shown. Thus, at the junction of resistor 86 and capacitor 87, there appear voltage spikes corresponding to the leading and trailing sides of the clipped output pulses of terminal 41 of current sensor 38.

The common collector connection of transistors 62 and 63 is connected to an identical circuit arrangement as is the common collector connection of transistors 48 and 49 described above. Briefly, base 2 of unijunction transistor 88 is connected to the common collector connection, base 1 is connected through resistor 89 to ground and emitter 90 is connected to the junction between an RC combination comprising resistor 91 and capacitor 92 which, in turn, are connected to a source 69 of positive direct current potential and to ground, respectively. The junction between the RC combination 91–92 is connected to base 93 of switching transistor 94 through Zener diode 95. Base 93 is also connected through resistor 96 to ground. Emitter 97 is connected directly to ground and collector 98 is connected to a source 69 of positive direct current potential through resistor 99. A differentiating circuit consisting of resistors 100 and 101 and capacitor 102 is connected to collector 98 as shown in FIGURE 1 so that voltage spikes appear at the junction of resistor 101 and capacitor 102 corresponding to the leading and trailing sides of the clipped output pulses appearing at output terminal 42 of current sensor 38.

The voltage spikes appearing alternately at the junction of the RC combinations 86–87 and 101–102 comprise the input signals to a pair of NPN switching transistors 103 and 104, respectively, arranged and interconnected generally as a bistable multivibrator. The base 105 of transistor 103 is connected to the junction of RC combination 86–87 through diode 106 arranged to conduct away from the transistor base. Base 107 of transistor 104 is similarly connected to the junction of RC combination 101–102 through diode 108 arranged to conduct away from the transistor base. Emitter 109 and emitter 110 of the two transistors are connected together and to ground through a parallel arrangement of resistor 111 and diode 112 arranged to conduct toward ground potential. Collectors 113 and 114 of transistors 103 and 104, respectively, are connected through resistors 115 and 116 to sources 57 and 69 of positive direct current potential. The conventional multivibrator cross connections are employed and consist of the parallel combination of resistor 117 and capacitor 118 connected between collector 113 of transistor 103 and base 107 of transistor 104 and the parallel combination of resistor 119 and capacitor 120 connected between collector 114 of transistor 104 and base 105 of transistor 103. In addition, base 105 is connected to ground through resistor 121 and base 107 is connected to ground through resistor 122.

The bistable multivibrator described above is of generally conventional configuration and employs a pair of NPN switching transistors arranged so that the multivibrator is switched from one state to another by a negative trigger pulse applied to the base of the on or saturated transistor. Thus, the negative voltage spikes which appear alternately at the junctions of the RC combinations 86–87 and 101–102 trigger the switching of the bistable multivibrator section back and forth between its two stable states. The provision of the differentiating circuit in the trigger input of the two multivibrator transistors provides a sharp triggering action tending to precisely time the switching of the multivibrator with the zero crossing of the output voltages of the cycloconverter as sensed by current sensor 38.

The collector outputs of the two switching transistors 103 and 104 of the bistable multivibrator section supply the activating signals for controlling the blanked and unblanked condition of the firing signals provided for the two current-conducting groups of a cycloconverter. The multivibrator insures the general objective of permitting only one of the two groups to conduct at a time because of the inherent quality of multivibrators which involves the control of each of the switches by the other and prescribes that, at any given time, opposite conditions must exist in the two switches.

The outputs of the multivibrator comprising collector 113 of transistor 103 and collector 114 of transistor 104 are each connected to an RC time delay network contained generally within broken line box B and arranged to introduce a time delay between the occurrence of the blanking of one of the cycloconverter groups and the unblanking of the other group during the alternating group switching operation. This time delay feature is disclosed in connection with an astable multivibrator in the co-pending application mentioned above.

The RC time delay network associated with transistor 103 consists of resistor 123 and capacitor 124 connected as shown between source 57 of positive direct current potential and ground. A diode 125 is connected between the junction of resistor 123 and capacitor 124 and collector 113 of transistor 103 and arranged to provide low impedance conduction toward the collector.

Another RC network consisting of resistor 126 and capacitor 127 is associated with transistor 104 and connected as shown between source 69 of positive direct current potential and ground. A diode 128 is connected between the junction of resistor 126 and capacitor 127 and collector 114 and arranged to provide low impedance conduction toward the collector.

Associated with the RC combination 123–124 is an NPN switching transistor 129 having its base 130 connected through a Zener diode 131 poled as shown to the junction of RC combination 123–124. Source 57 of positive direct current potential is connected to collector 132 through resistor 133 and emitter 134 is connected to ground.

Another NPN transistor 135 is associated with the RC combination 126–127 having its base 136 connected through Zener diode 137 as shown to the junction of resistor 126 and capacitor 127. Source 69 of positive direct current potential is applied to collector 138 through resistor 139 and emitter 140 is connected to ground.

Output signals alternately appear at collectors 132 and 138 of transistors 129 and 135, respectively, in accordance with changes in state or switching of the bistable multivibrator. Output signals may appear at both collectors at the same time, though both may not be absent or off at the same time as will be described below.

As used in conjunction with a cycloconverter, collector 132 is connected by conductor 141 to the base of transistor 36 and collector 138 of transistor 135 is connected by conductor 142 to the base of transistor 37. As explained more fully below in connection with the circuit operation and its relationship to the cycloconverter, an output signal appears at collector 132 when negative group 12 of the cycloconverter is providing output current and at collector 138 of transistor 135 when positive group 11 is providing output current. In this manner, the alternating output signals of the combined circuit means A and B are employed to divert, suppress or otherwise blank the firing signals intended for positive group 11 when negative group 12 is conducting and vice versa.

The operation of the alternating group switching circuit means is described below in conjunction with a cycloconverter. Let it be assumed that current provided by positive group 11 of cycloconverter 10 flows in the output circuit supplying the load. Current sensor 38 is arranged so that a voltage pulse appears at output terminal 42 and is applied to base 61 of transistor 62, turning on the Darlington-connected transistors 62 and 63. Conduction by transistor 63 places base 2 of unijunction transistor 88 essentially at ground potential. As a result, emitter 90 is in a low impedance state, resulting in a very low or nearly zero voltage across capacitor 92. At this point, transistor 94 is off for lack of sufficient base drive.

When the output current supplied by positive group 11 falls to zero, Darlington-connected transistors 62 and 63 immediately turn off to bias base 2 of unijunction transistor 88 to a high potential. The impedance seen at emitter 90 of unijunction transistor 88 increases and capacitor 92 begins charging through resistor 91 toward the potential of source 69 of direct current voltage. When the charge on capacitor 92 reaches the breakdown voltage of Zener diode 95, the diode conducts and turns on transistor 94. In the conducting state, collector 98 of transistor 94 falls essentially to ground potential. The change in potential of collector 98 is differentiated by the succeeding RC circuit and the discharge of capacitor 102 produces a negative voltage spike constituting a trigger signal to the base 107 of multivibrator transistor switch 104.

Under certain circumstances of operation discussed above and when the cycloconverter output current $I_L$ might be of a form having multiple zero crossings as shown in FIGURE 4, the output current supplied by positive group 11, for example, may fall to zero as at point 24 and then suddenly increase in a positive direction from zero as at point 25 in FIGURE 4. If such is the case and the positive output current resumes before the charge on capacitor 92 has reached the breakdown voltage of Zener diode 95, Darlington-connected transistors 62 and 63 will turn on, causing emitter 90 of unijunction transistor 88 to be driven to a very low impedance state from which it will not recover until capacitor 92 is fully discharged. In this manner, the time delay circuit containing capacitor 92 is completely reset so that it produces only complete time delays of a prescribed duration and cannot produce partial period time delays.

Considering the portion of this circuit whose operation has just been discussed, it will be apparent that a negative voltage spike produced by the discharge of capacitor 102 is produced and supplied to the base 107 of multivibrator switching transistor 104 every time that the output current $I_L$ supplied by positive group 11 of the cycloconverter falls to zero and remains zero or less for a predetermined length of time. Also, the negative voltage spike appears, if at all, a predetermined length of time after the output current $I_L$ first falls to zero. It will be apparent that the circuit provides a time delay whose length can be predetermined to negate the effect of multiple zero crossings of cycloconverter output current.

In a similar manner, Darlington-connected transistors 48 and 49 connected to output terminal 41 of current sensor 38 and the circuit elements following, such as unijunction transistor 73, RC combination 75–76, Zener diode 78, switching transistor 80 and the differentiating network, are responsive to that portion of the output current $I_L$ provided by negative group 12 of cycloconverter 10. When that portion of output current $I_L$ provided by negative group 12 crosses zero going positive, capacitor 76 begins charging through resistor 75 from source 57 of positive direct current potential. If output current $I_L$ remains positive with respect to the zero level long enough to charge capacitor 76 to the breakdown voltage of Zener diode 78, switching transistor 80 fires and the differentiating circuit connected to its collector output 83 produces a negative voltage spike for triggering switching transistor 103 of the multivibrator. The negative voltage pulse appears, if at all, a predetermined length of time after the output current $I_L$ supplied by negative current-conducting group 12 reaches zero going positive. If output current $I_L$ goes negative before capacitor 76 is charged to breakdown voltage of Zener diode 78, the capacitor is completely discharged and the time delay circuit reset.

From the foregoing partial explanation of the operation, it will be apparent that a negative voltage spike appears at one point in the circuit whenever the output current $I_L$ crosses the zero level going positive and remains across it for a predetermined length of time and a negative voltage spike appears at another point in the circuit when the output current $I_L$ crosses the zero level going negative and remains across it for a predetermined length of time. In order to provide the desired blanking of the firing pulses supplied by the firing circuits associated with each of the current-conducting groups, the junction of the two RC combinations 86–87 and 101–102 at which the negative voltage spikes appear are connected respectively to the two trigger inputs of the bistable multivibrator described above. When a negative voltage pulse appears at the junction of RC combination 101–102 as a result of the positive half wave of output current $I_L$, falling to and remaining below zero level for a predetermined length of time, transistor 104 of the multivibrator is forced into a non-conducting state or turned off. The turning off of multivibrator transistor 104 turns on transistor 103.

When transistor 103 conducts, the potential of collector 113 falls and capacitor 124 is effectively short circuited and discharged. The cathode potential of Zener diode 131 falls below breakdown voltage and switching transistor 129 is rendered non-conducting. When switching transistor 129 is non-conducting, the potential appearing at its collector 132 is high enough to turn on transistor 36 connected to it by conductor 141.

In the sequence of events related above in connection with the multivibrator, it will be observed that switching transistor 129 is rendered non-conducting immediately upon the occurrence of a negative voltage spike at the base 105 trigger input of transistor 104 of the multivibrator. As mentioned before, when transistor 36 is conducting, the firing pulses supplied by firing circuit 14 are diverted from positive group 11 so that it is effectively rendered non-conducting.

The turning off of transistor 104 by the negative voltage spike applied to its base 107 increases the potential of its collector 114 so that capacitor 127 charges through resistor 126. When the potential of capacitor 127 exceeds the breakdown voltage of Zener diode 137, a signal is supplied base 136 which turns on transistor 135. The potential of collector 138 falls substantially to zero potential when transistor 135 is conducting, removing the base drive by means of conductor 142 from switching transistor 137. In this manner, switching transistor 37 is turned off, permitting the pulses supplied by firing circuit 15 to render negative current group 12 conducting. Because of the time required to charge capacitor 127 after the appearance of the negative voltage spike trigger pulse to transistor 104 of the multivibrator, switching transistor 37 is not turned off and, thus, firing pulses are not supplied to current-conducting group 12 until after the passage of a predetermined length of time following the appearance of a trigger pulse at transistor 104.

The description of the circuit operation set forth immediately above can be extended to cover the operational condition of the negative current-conducting group supplying the cycloconverter output current and crossing the zero current level going positive; at which time, the pulse appearing at output terminal 41 of current sensor 38 disappears. In such case, if the output current remains on the positive side of the zero level for a sufficient length of time to permit capacitor 76 to reach a potential exceeding the breakdown voltage of Zener diode 78, a negative voltage spike trigger pulse will be applied to the base input 105 of transistor 103 of the multivibrator. Transistor 103 is immediately turned off, permitting capacitor 124 to begin charging. Transistor 129 turns on when the capacitor potential exceeds the breakdown voltage of Zener diode 131. Turning on of transistor 129 reduces the potential of its collector 132, removing the base drive applied by conductor 141 to the base of transistor 36 so that transistor 36 is turned off and the firing pulses supplied by firing circuit 14 render current-conducting group 11 conducting.

When transistor 103 of the multivibrator is turned off, transistor 104, of course, is turned on, effectively short circuiting capacitor 127 and turning off transistor 135. With transistor 135 turned off, its collector 138 is raised to a high enough potential to drive switching transistor 17 into a conducting state. Thus, firing pulses provided by firing circuit 15 are diverted from current-conducting group 12, rendering it effectively non-conducting.

From the foregoing, it will be apparent that the circuit embodying this invention, when used with a cycloconverter, provides a blanking signal for effectively rendering one of the two current-conducting groups non-conducting when that portion of the output current supplied by the blanked group crosses the zero current level and does so a predetermined length of time after the zero crossing condition is maintained. Also, as a result of the aforesaid zero crossing of the cycloconverter output current, the other and previously blanked current-conducting group is unblanked and permitted to conduct a predetermined length of time after the blanking of the other current-conducting group as described above.

It will be apparent that the problems of cycloconverter operation caused by multiple zero crossings and false zero crossings of the output current, such as are shown in FIGURE 4 of the drawings and described in connection therewith, are solved by the circuits disclosed herein and embodying this invention. The length of the time delay that occurs between the time of beginning of a true zero crossing of the output current and the appearance of an indicating negative voltage spike is, of course, dependent upon the relative values of the resistors, condensers, direct current voltage supply and breakdown voltage of the Zener diodes involved in the circuit. We have found that the delay necessary to prevent a high percentage of false zero crossing signals from triggering the multivibrator is not deleterious in its net effect and results in an output current wave having substantially reduced distortion.

It is to be noted that the invention comprehends the possibility of employing the first delay referred to without the second delay, i.e. the delay accomplished after the multivibrator switching. Preferably, the first delay or that delay introduced ahead of the multivibrator and the second delay or that delay introduced after the multivibrator are used together as shown and described above. In the full double delay system, the blanking of the next-to-be-blanked and current-conducting group of the cycloconverter is delayed by the amount of the first delay and the unblanking of the next-to-be-unblanked current-conducting group is delayed by the sum of the first and second time delays. Thus, circulating currents between current-conducting groups of a cycloconverter are effectively prevented because it is possible for only one of said current-conducting groups to conduct at a time and, in fact, both groups are prevented from conducting during the time of the second delay. This is true even when the current-conducting groups employ switching and rectifying devices having control electrodes which initiate conduction but lose control thereafter, and distortion of the output current wave form is substantially reduced even when the cycloconverter is operated into a resistive load and/or at high frequency conversion ratios and/or at low ratios of reference voltage to signal voltage.

A modified arrangement of the preferred circuit shown and described above employs an astable multivibrator generally in place of the bistable multivibrator shown. An astable multivibrator in combination with a time delay network similar to the second one of this disclosure is shown and described in the co-pending application identified above. Such a multivibrator has the same advantages with respect to the second time delay of the subject circuit as mentioned in the co-pending application and, additionally, cooperates with the first time delay portion of the circuit located ahead of the multivibrator to provide the combined advantages of the double delay system.

When the modified arrangement of the preferred circuit shown is employed, the following simple changes are necessary. Multivibrator transistors 103 and 104 must be interconnected and arranged for operation in their active regions to provide an astable or free-running multivibrator. In addition, the two differentiating circuits comprised of resistors 85 and 86 and capacitor 87 and comprised of resistors 100 and 101 and capacitor 102 as well as diodes 106 and 108 are eliminated and collector 83 of transistor 80 is connected directly to base 105 of multivibrator transistor 103 and collector 98 of transistor 94 is connected directly to base 107 of transistor 104. The relatively square voltage pulses alternately appearing at collectors of switching transistors 80 and 94 synchronize and tend to hold conducting the appropriate one of the two multivibrator transistors. The off one of the two multivibrator transistors is turned on by free-running multivibrator action and is held on by the appearance of the appropriate output current and the square pulse wave resulting therefrom.

With respect to the free-running frequency of the astable multivibrator, it will be understood that the time constants of the cross-coupling RC networks are selected with respect to the time constants of the subsequent RC time delay networks so that the free-running multivibrator will remain in one or the other of its switching states a sufficient length of time to charge the appropriate one of capacitors 124 and 127 to the breakdown voltage of Zener diodes 131 and 137, respectively. This time relationship is necessary in order to permit an output signal to be produced which corresponds to each of the multivibrator's two switching states.

It will be noted that the free-running feature of the astable multivibrator will, in the event of no conduction occurring in a particular cycloconverter group automatically switch and unblank the other group and continue to do so until conduction occurs. This feature is particularly advantageous when large transients are present in the output current $I_L$ during which the interval of conduction of a particular cycloconverter is small or nonexistent.

The form of the double delay system employing the bistable multivibrator and the form employing the astable multivibrator both employ the same broad principles of operation and enjoy the same fundamental features and advantages. Both forms of the double delay system by means of multivibrator action and time delay networks insure zero output during switching from one current-conducting group to the other of a cycloconverter and, thus, the complete elimination of intergroup circulating currents in a cycloconverter. In this way, they both contribute substantially to the reduction in output distortion and losses otherwise encountered in the operation of cycloconverters. Additionally, they overcome the problems arising from operations into heavily resistive loads, for example, or other conditions producing multiple or false zero crossings by the output current. A further advantage is that system weight is reduced because chokes for suppressing circulating currents are not required in the output circuit and the overall efficiency of the system is increased.

While the means described for diverting, suppressing or otherwise blanking the firing signals produced by a firing circuit associated with one or the other of the two cycloconverter current-conducting groups as being transistor switches 36 and 37 connected as shown, the invention comprehends other suitable means to utilize the output signals of the alternating group switching circuit.

Even though the time delay circuit in both its single and double delay aspects has been described herein in connection with a cycloconverter and as a means for controlling the current-conducting groups of a cycloconverter in accordance with alternations in the cycloconverter alternating output current, the invention comprehends the pulse-forming circuit comprising, in particular, that part of FIGURE 1 within the broken line boxes A and B taken together and that part of the circuit of FIGURE 1 contained within broken line box A taken alone.

The circuit described above and shown in the drawings contains NPN transistors. As will be apparent to those skilled in the art, transistors of the PNP type may be substituted if the proper and appropriate changes in polarities are made. The invention comprehends not only the circuits shown and described and employing NPN transistors, but also comprehends an equivalent circuit which may be built up of PNP transistors.

Those skilled in the art will appreciate that various other changes and modifications can be made in the preferred form of apparatus described herein without departing from the spirit and scope of the invention.

We claim:
1. A signal-producing circuit comprising:
   a D.C. voltage source,
   a pair of input terminals for receiving input signals,
   a time delay network operatively connected to each of said input terminals and said voltage source for passing input signals of a predetermined duration supplied to said input terminals,
   a multivibrator having inputs connected to said time delay networks and said D.C. voltage source and having a switching state corresponding to the appearance of a signal at one of said inputs and a switching state corresponding to the appearance of a signal at the other of said inputs,
   a pair of output circuit means operatively connected to said D.C. voltage source and to said multivibrator and responsive to the switching state of said multivibrator for providing an output signal at only one of said output circuit means when said multivibrator is maintained in one of its two switching states and at only the other of said output circuit means when said multivibrator is maintained in the other of its two switching states.

2. The circuit according to claim 1 together with a time delay means interposed said multivibrator and each of said output circuit means for delaying the removal of the output signal corresponding to one of the switching states of said multivibrator a predetermined length of time after the appearance of an output signal at the other of said output circuit means and corresponding to the other of said switching states of said multivibrator.

3. The circuit according to claim 1 in which each of said time delay networks includes a switch connected to its associated input terminal and responsive to the input signals applied thereto, said switch having a conducting and a non-conducting state, a resistor-capacitor series combination connected to said D.C. voltage source and said switch and so arranged with respect thereto that said capacitor is charged from said D.C. source through said resistor when said switch is in one of its two states and so that said capacitor is discharged when said switch is in the other of its two states, a Zener diode responsive to the charge on said capacitor for permitting a time delay signal to pass to said multivibrator when the charge on said capacitor exceeds the breakdown potential of said Zener diode.

4. The circuit according to claim 2 in which said multivibrator is astable and free running between each of its two switching states in the absence of a signal applied to either of its input terminals and held in one of its two switching states when a signal is applied to one of its input terminals and held in the other switching state when a signal is applied to the other of its input terminals.

5. The circuit according to claim 2 in which said multivibrator is bistable and has two stable switching states and which is responsive to a trigger signal applied to one of its inputs to switch it to one of its two stable states and to a trigger signal applied to the other of its two inputs to switch it to the other of its two stable states.

6. In a cycloconverter system having a supply circuit, an output circuit, a pair of current-conducting groups connected in parallel with each other between and back-to-back with respect to said supply and output circuits for alternately conducting current from said supply circuit to said output circuit in response to firing pulses supplied to one of said pair of current-conducting groups and from said output circuit to said supply circuit in response to firing pulses supplied to the other of said pair of current-conducting groups to provide alternating cycloconverter output current, and a firing circuit means associated with and for supplying firing pulses to each of said current-conducting groups, the combination with said current-conducting groups and their associated firing circuits of current controlling means responsive to the conducting state of each of said pair of current-conducting groups for insuring that only one of said pair of current-conducting groups conducts at one time, said current-controlling means comprising sensing means for sensing the current conducted by each of said groups and for providing signals indicating and corresponding thereto, firing pulse blanking means responsive to blanking and unblanking signals and associated with each of said groups and its firing circuit for permitting and preventing firing pulses to reach each of said groups, group switching circuit means interconnecting each of said firing pulse blanking means and said sensing means and responsive to signals of said sensing means indicating when each of said groups becomes non-conducting and remains non-conducting for a predetermined length of time for providing blanking signals to said firing pulse blanking means associated therewith and for terminating blanking signals being supplied said firing pulse blanking means associated with the corresponding other one of said groups.

7. The combination according to claim 6 in which said sensing means comprises a center-tapped current transformer winding inductively associated with said cycloconverter output circuit and parallel back-to-back sets of rectifying devices connected in parallel with each half of said winding for alternately providing at opposite ends of said winding output signals of like polarity with respect to said center tap in accordance with alternations in the cycloconverter output current.

8. The combination according to claim 6 together with means included in said group switching circuit means for delaying for a predetermined time interval the termination of blanking signals provided thereby to said corresponding other one of said groups after the provision of blanking signals to said each of said groups.

9. The combination according to claim 6 in which said group switching means includes multivibrator means switchable to and between two opposite states and responsive to signals of said sensing means for providing blanking signals to one and to the other of said firing pulse blanking means when in one and the other of its states respectively.

10. The combination according to claim 6 in which said group switching circuit means comprises:

a pair of inputs connected to said sensing means, a D.C. voltage source, a time delay network operatively connected to each of said inputs and said voltage source for time delaying indicating signals supplied by said sensing means to said inputs, a bistable multivibrator having a trigger input connected to each of said time delay networks and to said D.C. voltage source and switchable from a first stable state to a second stable state in response to a signal from said time delay networks applied to one of said trigger inputs and from its second stable state to its first stable state in response to a signal from said time delay networks applied to the other of said trigger inputs, output circuit means operatively connected to said voltage source, to said bistable multivibrator and to each of said firing pulse blanking means for providing an output signal to one of said firing pulse blanking means when said bistable multivibrator is in its first stable state and to the other of said firing pulse blanking means when said bistable multivibrator is in its second stable state.

11. The combination according to claim 10 together with a second time delay network operatively interconnected said bistable multivibrator and said output circuit means for delaying the removal of the output signal provided to said output circuit means when said multivibrator is in one of its two stable states for a predetermined length of time after the switching of said multivibrator to the other of its two stable states.

12. The combination according to claim 6 in which said group switching circuit means comprises:

a pair of inputs connected to said sensing means, a D.C. voltage source, a time delay network operatively connected to each of said inputs and said voltage source for time delaying indicating signals supplied by said sensing means to said inputs, astable multivibrator means having a trigger input connected to each of said time delay networks and to said D.C. voltage source and having two switching states, said multivibrator switching means being responsive to signals from said time delay networks for holding it in one of its two switching states and free running between its two switching states in the absence of a signal from said time delay networks, output circuit means operatively connected to said voltage source, to said astable multivibrator and to each of said firing pulse blanking means for providing an output signal to one of said firing pulse blanking means when said astable multivibrator is in its first stable state and to the other of said firing pulse blanking means when said astable multivibrator is in its second stable state.

13. The combination according to claim 12 together with a second time delay network operatively interconnected said astable multivibrator and said output circuit means for delaying the removal of that signal provided to the output circuit means when said multivibrator is switched to and held in one of its two states for a predetermined length of time after the switching to and holding of said multivibrator in the other of its two states.

No references cited.

JOHN F. COUCH, *Primary Examiner.*

W. SHOOP, *Assistant Examiner.*